US009776864B2

(12) United States Patent
Bravo et al.

(10) Patent No.: US 9,776,864 B2
(45) Date of Patent: Oct. 3, 2017

(54) ELEMENTAL SELENIUM NANOPARTICLES AND PRODUCTION METHOD

(71) Applicant: Pancosma S.A., Le Grand Saconnex (CH)

(72) Inventors: David Bravo, Yverdon-les-Bains (CH); Lenz Markus, Weil am Rhein (DE)

(73) Assignee: Pancosma S.A., Le Grand Saconnex (CH)

( * ) Notice: Subject to any disclaimer, the term of this patent is extended or adjusted under 35 U.S.C. 154(b) by 0 days.

(21) Appl. No.: 14/898,607

(22) PCT Filed: Jun. 18, 2014

(86) PCT No.: PCT/EP2014/062865
§ 371 (c)(1),
(2) Date: Dec. 15, 2015

(87) PCT Pub. No.: WO2014/202686
PCT Pub. Date: Dec. 24, 2014

(65) Prior Publication Data
US 2016/0137501 A1    May 19, 2016

(30) Foreign Application Priority Data

Jun. 19, 2013  (EP) .................................... 13003121
Nov. 4, 2013   (FR) .................................... 13 02552

(51) Int. Cl.
*C01B 19/02* (2006.01)

(52) U.S. Cl.
CPC .......... *C01B 19/02* (2013.01); *C01P 2004/03* (2013.01); *C01P 2004/62* (2013.01)

(58) Field of Classification Search
CPC .. C01B 19/02; C01P 2004/03; C01P 2004/62; C12Y 207/09003; C04B 35/547
See application file for complete search history.

(56) References Cited

U.S. PATENT DOCUMENTS

| 4,127,235 A | * | 11/1978 | Klaile | B22F 9/04 |
| | | | | 241/1 |
| 6,398,125 B1 | | 6/2002 | Liu et al. | |
| 2012/0207846 A1 | * | 8/2012 | Gao | B82Y 30/00 |
| | | | | 424/499 |

FOREIGN PATENT DOCUMENTS

| CN | 1686789 A | * | 10/2005 |
| CN | 102174119 A | * | 9/2011 |

(Continued)

OTHER PUBLICATIONS

Li Yin, Gongyuan Wei, and Jian Chen. "Glutathione: a review on biotechnological production." Applied microbiology and biotechnology 66.3 (2004): 233-242.*

(Continued)

*Primary Examiner* — Richard M Rump
(74) *Attorney, Agent, or Firm* — Rudy J. Ng; Bret E. Field; Bozicevic, Field & Francis LLP

(57) ABSTRACT

The invention relates to elemental selenium nanoparticles, especially a product containing selenium nanoparticules, that can be produced from at least one organic compound and at least one selenium source, with a step of drying by atomisation. The invention also relates to a method for producing such a product and to a method for enriching, with elemental selenium nanoparticles, a product which already comprises elemental selenium nanoparticles.

24 Claims, 3 Drawing Sheets

(56) References Cited

FOREIGN PATENT DOCUMENTS

Figure 1:
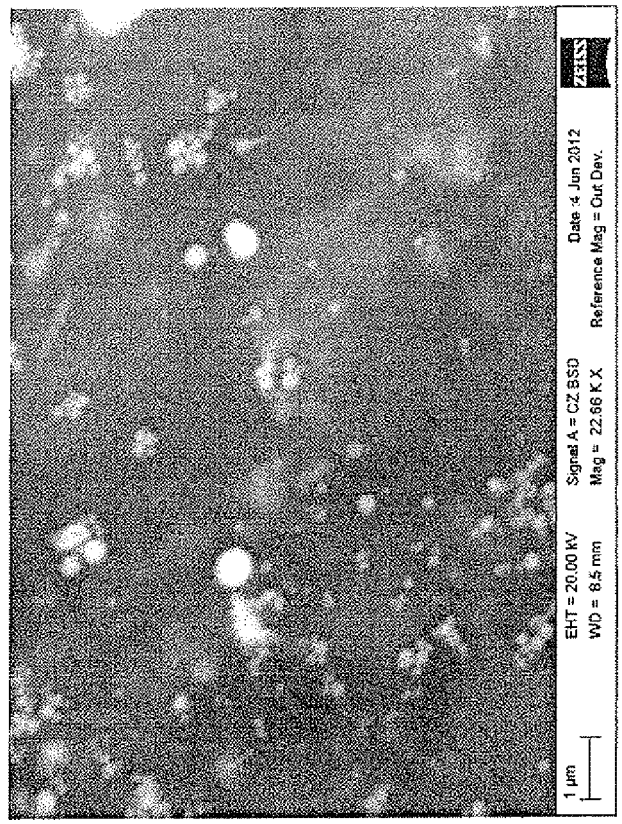
Figure 1:
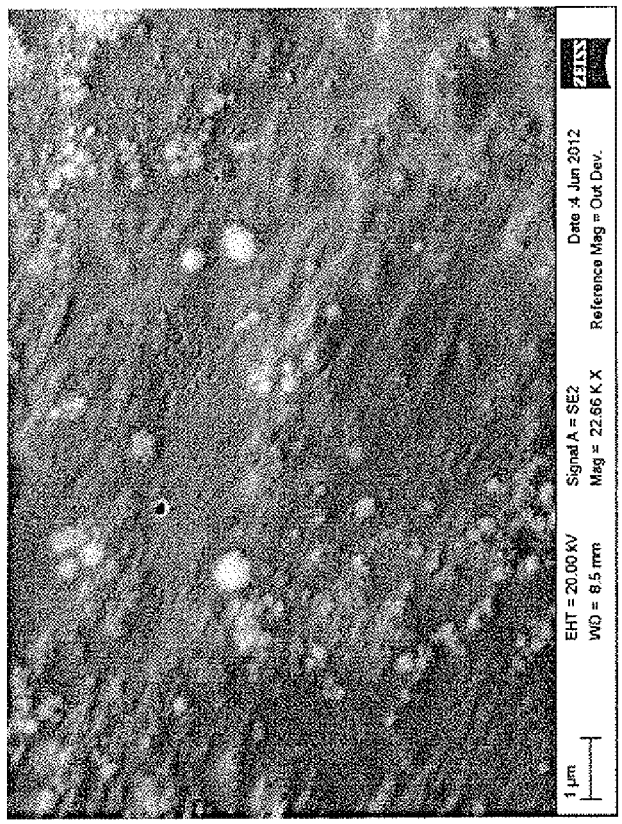

GB          1574194 A     9/1980
WO    WO2009010922 A2    1/2009

OTHER PUBLICATIONS

Tran, Phong A., and Thomas J. Webster. "Selenium nanoparticles inhibit *Staphylococcus aureus* growth." Int J Nanomedicine 6 (2011): 1553-1558.*

Kong et al., The suppression of prostate LNCaP cancer cells growth by Selenium nanoparticles through Akt/Mdm2/AR controlled apoptosis, Biomaterials. Sep. 2011;32(27):6515-22.

Gao et al., Hollow Sphere Selenium Nanoparticles: Their In-Vitro Anti Hydroxyl Radical Effect, Advanced Materials (Impact Factor: 17.49). Feb. 2002; 14(4):290-293.

Gates et al., Synthesis and Characterization of Uniform Nanowires of Trigonal Selenium, Adv. Funct. Mater. 2002, 12, No. 3, March.

Zhang et al., Biological effects of a nano red elemental selenium, Biofactors. 2001;15(1):27-38.

* cited by examiner

ELEMENTAL SELENIUM NANOPARTICLES AND PRODUCTION METHOD

The invention relates to elemental selenium nanoparticles, especially a product containing selenium nanoparticles, and to a method for producing such a product and to a method for enriching, with elemental selenium nanoparticles, a product which already comprises elemental selenium nanoparticles.

BACKGROUND OF THE INVENTION

The U.S. patent applications published under the numbers US 2012/0202062 and US 2012/0207846 describe the production of stable amorphous elemental selenium nanoparticles. They are prepared through reaction of a source of selenium with a reducing or oxidizing agent in a liquid medium at a temperature between 0 and 100° C. and in the presence of a macromolecule.

It is written in paragraphs [0047] of the aforementioned applications that the product of the reaction, which can be performed in a liquid medium, is a nanoparticle powder which can be isolated by simply removing the water from the reaction medium. This can be performed by evaporation, filtration or any means obvious to those skilled in the art.

SUMMARY OF THE INVENTION

The main purpose of the invention is to propose improvements both in the products and in the processes described in the aforementioned patent applications.

The inventors discovered to their surprise that the drying of the nanoparticles could result in more than a simple removal of water and could, under certain conditions, significantly contribute to an increase in the yield of nanoparticles. Studying this unexpected phenomenon, they found that a reduction of the residual sodium selenite could occur during the drying, leading in fact to an increase in the amount of elemental selenium nanoparticles produced.

Indeed, for a person skilled in the art (chemist or technologist), the implementation of spray drying cannot contribute to the reduction of sodium selenite to elemental selenium. Hot spraying consists of a rapid removal of water from a liquid sample to convert it into powder. There is normally no chemical reaction because the spraying is a physical organization of the microparticles constituting the powder. It is therefore in principle not possible for such a process to contribute to the reduction of sodium selenite. Such a result was therefore quite unforeseeable.

The invention thus uses this unexpected discovery, offering a product containing selenium nanoparticles that can be obtained from:
- at least one organic compound and
- at least one source of selenium, by implementing a spray drying step.

In particular, the product according to the invention may be a product containing selenium nanoparticles essentially based on:
- at least one reducing compound such as an amine compound,
- at least one source of selenium and
- optionally, at least one pH modifier, in which the nanoparticles have a size greater than 300 nm and preferably no more than 600 nm.

It could also be a product containing selenium nanoparticles essentially based on:
- at least one reducing compound, such as an amine compound, with the exception of macromolecules,
- at least one source of selenium and
- optionally, at least one pH modifier.

The invention also relates to a process for preparing a product containing selenium nanoparticles which has the particularity of including a spray drying step.

Lastly, the invention also proposes a process for enriching a product containing selenium nanoparticles through a spray drying step.

Figure 2:
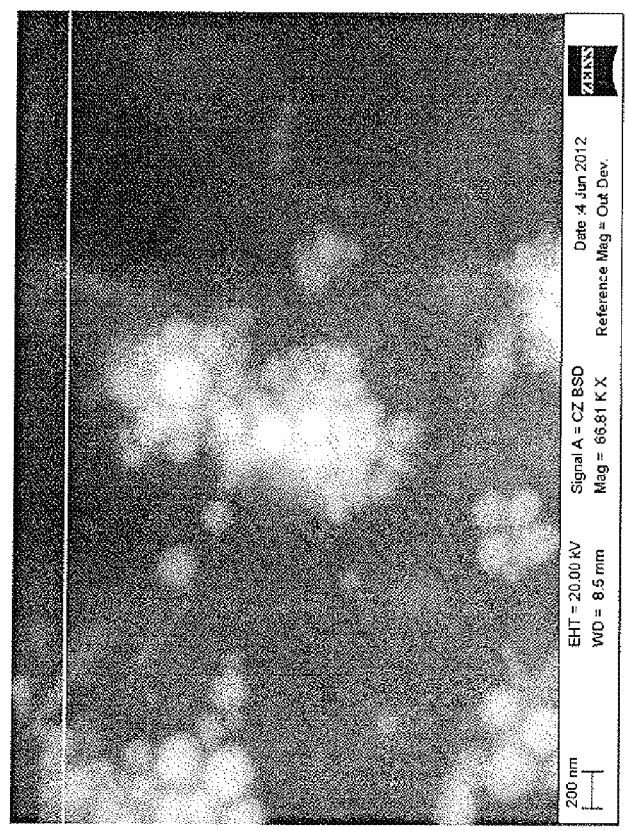
Figure 2:
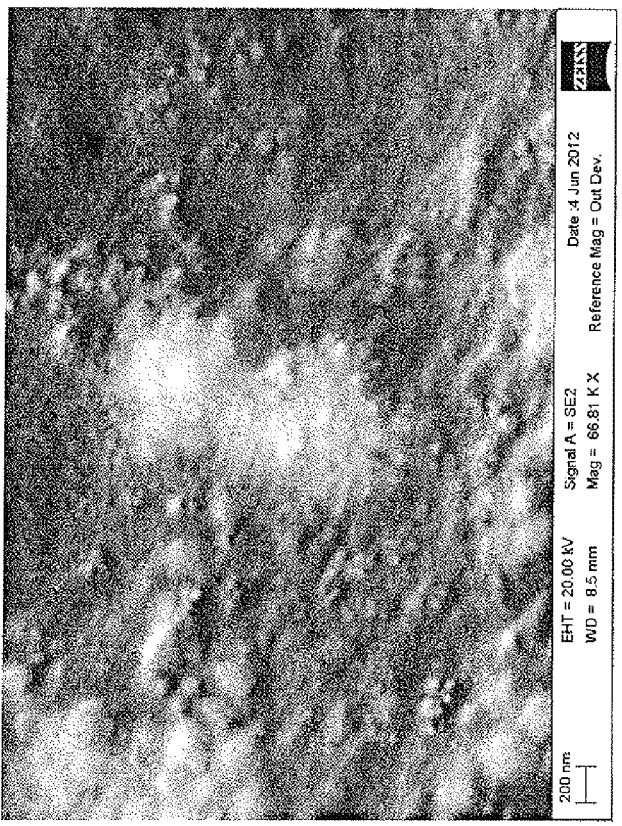
Figure 3:
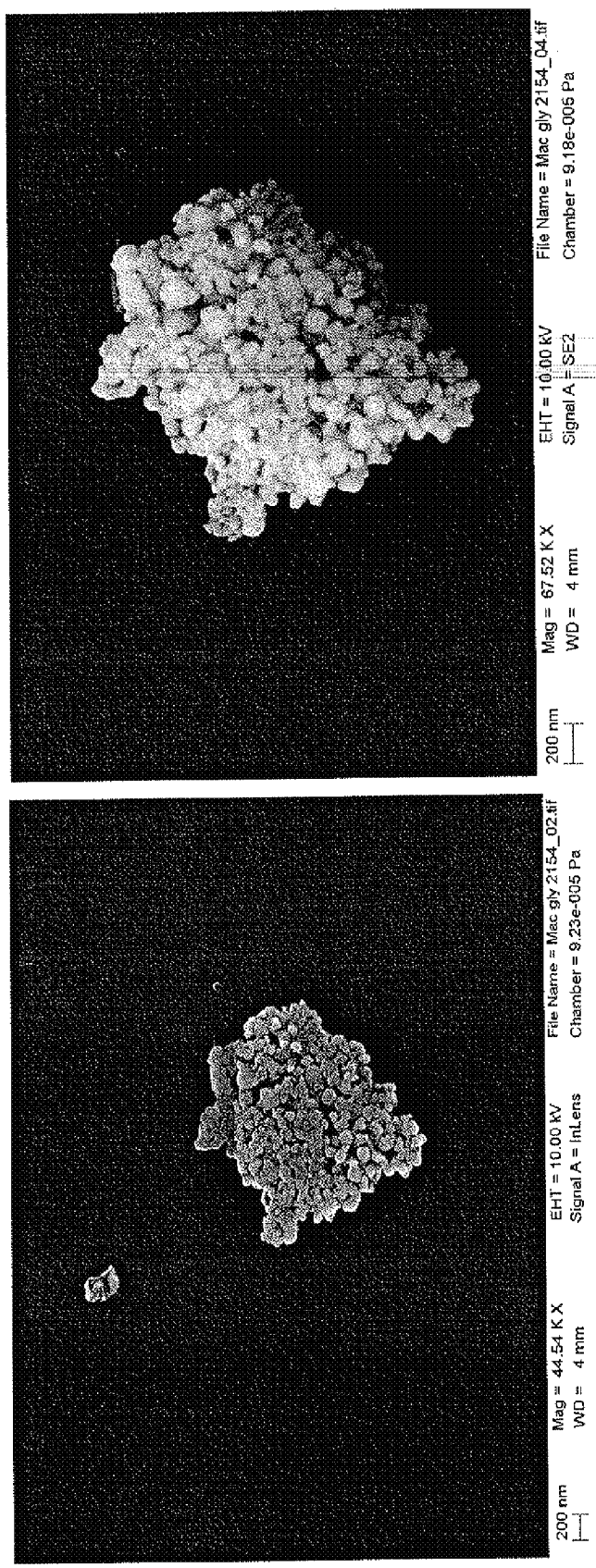

Other characteristics and advantages of the invention will now be described in detail in the following disclosure which is given with reference to the accompanying figures, which show schematically:

FIGS. 1 to 2: elemental selenium nanoparticles in a powder sample of the product obtained from soy protein; and FIG. 3: elemental selenium nanoparticles in a powder sample of the product obtained from glycine.

DETAILED DISCLOSURE OF THE INVENTION

According to a first embodiment of the invention, the product containing selenium nanoparticles can be obtained from:
- at least one organic compound and
- at least one source of selenium, by implementing a spray drying step.

The organic compound can be very varied in nature. It may be for example a fiber source.

In particular, it may be an amine compound.

According to a second preferred embodiment of the invention, the product containing selenium nanoparticles is essentially based on:
- at least one reducing compound such as an amine compound,
- at least one source of selenium and
- optionally, at least one pH modifier, in which the nanoparticles have a size greater than 300 nm and preferably no more than 600 nm.

According to a third preferred embodiment of the invention, the product containing selenium nanoparticles is essentially based on:
- at least one reducing compound, such as an amine compound, with the exception of macromolecules,
- at least one source of selenium and
- optionally, at least one pH modifier.

In this embodiment, the amine compound is preferably a relatively short-chain compound, that is to say that it is not in principle a macromolecule. However, it may be a degraded macromolecule, for example a protein such as a soy, plasma, milk or egg protein which has undergone digestion with an enzyme, such as a protease.

Whatever the embodiment, the amine compound may also be an amino acid, particularly glycine.

The source of selenium may be any suitable source of selenium, provided that it reacts with the organic matter during preparation. Sodium selenite ($Na_2SeO_3$) or sodium selenate ($Na_2SeO_4$) is preferably used.

Under certain conditions, particularly when the source of selenium is very acidic, the pH modifier can be dispensed with.

When a pH modifier is necessary, it can be any product that can increase or decrease the pH. To increase the pH, a Bronsted base, in particular sodium hydroxide, can therefore be used.

To decrease the pH, a Bronsted acid such as phosphoric acid can be used. A polybase or a polyacid could possibly be used, if the preparation conditions and the purpose of the product are suitable.

The product according to the first or third embodiment of the invention generally contains selenium nanoparticles having a size which can range from 1 to 1000 nm, especially from 100 to 600 nm.

Method of the Invention

The method of the invention for preparing a product containing selenium nanoparticles has the particularity of comprising a spray drying step.

The inventors found that spraying, particularly high-temperature spraying, may be accompanied by thermal decomposition which is an oxidizing reaction in which the amine compound decomposes and loses electrons. As this phenomenon takes place in a closed and saturated environment (that is to say, normally in a spray tower), it seems that the released electrons are captured by the residual sodium selenite (not reduced by the reaction in the liquid medium), which causes the appearance of additional elemental selenium nanoparticles, resulting in an improved overall yield.

The method of the invention can be applied to any product already containing selenium nanoparticles. It can therefore be used to refine, that is to say, enrich, any product containing selenium nanoparticles, especially the product described in the aforementioned U.S. patent applications.

According to one embodiment of the invention, the method of the invention comprises the following steps:
a) producing a solution or suspension of the amine compound(s),
b) adding, with stirring, at least one pH modifier,
c) adding, with stirring, at least one source of selenium, and
d) subjecting the resulting mixture to spray drying.

Naturally, steps a) to c) may be in a different order.

Spray drying is generally performed at a temperature of more than 100° C., preferably at least 120° C., more preferably at least 160° C., in particular at least 180° C. and most preferably at least 200° C.

EXAMPLES

Prerequisite on Analytical Methods: Total Selenium, Selenium Species, Nanoparticles The analysis takes place in three stages. The product samples to be analyzed are dissolved in aqua regia.

In a first step, the total selenium content of the samples is determined using ICP-MS (Inductively Coupled Plasma Mass Spectrometry).

In a second step the species of selenium is revealed by coupling ion chromatography in line with the ICP-MS; comparison of the retention times with known standards gives the species of selenium in the sample and enables the fraction of each species to be calculated as a proportion of the total selenium content.

Lastly, in a third step, the structure of the selenium is investigated by Scanning Electron Microscopy (SEM) and NanoSight microscopy which enables analysis and viewing of nanoparticles between 10 and 1000 nm Prior to the analysis, the samples are centrifuged with sodium polytungstate whose density is 3 g/cm$^3$, which removes unwanted matrices. For the SEM analysis, the secondary electron images show the morphology of the particles containing the selenium and their surface topography. A backscattered electron detector determines the composition of these particles. Lastly, the "NanoSight" microscope uses diffracted laser light and the Brownian motion of the particles to analyze their size and distribution.

Description of the Process Used

This process comprises two successive steps: preparation of a liquid phase and its spraying.

1) Use of Soy Protein

All the preparation is performed under agitation. A mixer is filled with 1,428 liters of water. The stirrers of the mixer are started. A mass of 420 kg of soy protein is added. The product is transferred into process tanks. These operations are repeated twice per tank. The process tanks are set to heat to 70° C. A mass of 16.74 kg of enzyme (protease) is poured into the tank. When the temperature reaches 70° C., the mixture is allowed to react for 5 hours. The temperature is then increased to 90° C. When the temperature reaches 85° C., 35 kg of caustic soda is added and the solution is mixed for 1 minute. When the temperature reaches 88° C., a mass of 22.73 kg of 45% sodium selenite is added to the solution and it is stirred for 1 minute. The mixture is then left to stand, without stirring, for 10 minutes. When the temperature reaches 90° C., 17 kg of caustic soda is added to the solution and it is stirred for 1 minute. The mixture is then left to react for about 15 minutes and until the appearance of the desired dark orange color. When this color is obtained, heating is stopped. The contents of the tank are rapidly transferred to a storage tank for spraying. A mass of 500 liters of water is added. Three hours later, 150 liters of water is added in the storage tank.

2) Use of Glycine

The following preparation is an alternative to the above preparation in which glycine replaces the soy protein and the pH is decreased. It could also be increased by adding caustic soda, just as in the previous preparation the pH could also be decreased.

A first tank is filled with 325 liters of water. While stirring, a mass of 100 kg of glycine is poured into the mixer. The stirring system of the process tank is switched on. The product is transferred from the first tank to the process tank. The tank heating is switched on with a target temperature of 55° C. A mass of 0.75 liters of phosphoric acid is added. The temperature is gradually increased to 55° C. and the pH stabilizes gradually. The temperature of the process tanks is increased to 88° C. The temperature increases gradually. When it reaches 88° C., a mass of 2.28 kg of sodium selenite is added. The heating system is switched off. Optionally, 1.84 kg of soy lecithin is added. The tank is connected to the pump of the spray tower. Spray drying can begin.

Spraying

The temperature chosen for the spraying of the liquid phases obtained as described above was approximately 220° C.

Results

Reduction of the selenite to elemental selenium nanoparticles in the liquid phase and the solid phase.

a) Product Obtained from Soy Protein

The procedure described above was implemented and liquid samples corresponding to the various steps and a sample of the powder obtained after spray drying were collected.

To quantify the intensity of the red color of the powder, a subjective classification was used in which 0 represents a sample that does not appear red and 10 represents a totally red sample. Intermediate values between 0 and 10 indicate increasing intensity of the red color.

Table 1 below shows the nano-elemental selenium content (as a percentage of the total selenium) of the liquid samples before spraying, together with the intensity of the red color.

TABLE 1 before spraying

| Description of sample | nano-elemental selenium (as percentage of total selenium) | Intensity of red color |
|---|---|---|
| Before adding of selenite | 0% | 0 |
| After first addition of caustic soda | 0% | 0 |
| After adding of sodium selenite | 49% | 5 |
| After second addition of caustic soda | 36% | 4 |
| After stopping of heating system | 30% | 4 |
| After stopping of heating system | 33% | 4 |
| After cooling | 40% | 5 |
| Average value after adding of sodium selenite | 38% | |

It can be seen that an average of 38% of the selenite was reduced to elemental selenium.

Table 2 below shows the nano-elemental selenium content (as a percentage of the total selenium) of the powder samples after spraying, together with the intensity of the red color.

TABLE 2 after spraying

| Powder sample | nano-elemental selenium (as percentage of total selenium) | Intensity of red color |
|---|---|---|
| 1 | 65.1 | 8 |
| 2 | 63.1 | 8 |
| 3 | 62.2 | 8 |
| 4 | 62.5 | 8 |
| 5 | 62.5 | 8 |
| Mean (standard deviation) | 63.1 (1.12) | |

The analysis therefore indicates that over 60% of selenium is reduced to elemental selenium in these samples. This shows that spray drying not only removes the water from the sample but also allows a refinement and significant improvement of the product by contributing to a further reduction of sodium selenite. This allows better advantage to be taken of the process by using sodium selenite which has not reacted during the liquid phase.

Thus, it is clear that spray drying of the liquid containing the elemental selenium nanoparticles does not only have the effect of eliminating the water. The spraying allows further reduction of the selenite to elemental selenium and therefore significant improvement and refinement of the product. It thus allows an increase of more than 20% in the elemental selenium in the product, leading to a content of over 63%.

FIGS. 1 and 2 show elemental selenium nanoparticles in a power sample of the product obtained from soy protein. In FIG. 1, the scale is 1 μm and in FIGS. 2 and 3 the scale is 200 nm.

b) Product Obtained from Glycine

Glycine was chosen for several reasons. Firstly, it is not described as a reducing amino acid; therefore, placing it in contact with the sodium selenite in the preparation of the liquid phase of the process should not allow the appearance of elemental selenium. Secondly, the thermal decomposition temperature of glycine is comparatively low.

It would appear that during the spraying part of the glycine thermally decomposes, thereby releasing electrons and contributing to the reduction of the sodium selenite.

The solution obtained in the liquid phase of the process is transparent white. This suggests that no reduction reaction has taken place during this phase. This is consistent with the fact that glycine is not a reducing amino acid. The absence of elemental selenium in the liquid samples is confirmed by the detailed chemical analyses in Table 3 below, which indicates the nano-elemental selenium content (as a percentage of the total selenium) of the liquid samples before spraying.

TABLE 3 before spraying

| Description of sample | nano-elemental selenium (as percentage of total selenium) | Intensity of red color |
|---|---|---|
| Before adding of selenite - before adding of acid | 0% | 0 |
| Before adding of selenite - after adding of acid | 0% | 0 |
| After adding of selenite - sample 1 | 15% | 0 |
| After adding of selenite - sample 2 | 14% | 0 |
| After stopping of heating system | 11% | 0 |
| After stopping of heating system | 13% | 0 |
| After cooling | 10% | 0 |
| Average value after adding of sodium selenite | 13% | |

The liquid was then dried following the procedure described for manufacturing the soy protein-based product. When the powder comes out of the spray tower, it is perfectly red, suggesting that a significant portion of the sodium selenite has been reduced to elemental selenium during the drying.

As shown in Table 4 below, the chemical analyses confirm that more than 60% of the selenium in the samples after drying is in the form of nano-elemental selenium.

TABLE 4 after spraying

| Powder sample | nano-elemental selenium (as percentage of total selenium) | Intensity of red color |
|---|---|---|
| 1 | 66.9 | 8 |
| 2 | 66.4 | 8 |
| 3 | 58.0 | 8 |
| 4 | 63.3 | 8 |
| 5 | 62.9 | 8 |
| Mean (standard deviation) | 63.5 (3.6) | |

This clearly demonstrates that drying of a sample containing sodium selenite and organic matter is not just a simple removal of water. Even when starting from a liquid totally devoid of elemental selenium, drying contributes to the reduction of nearly 50% of the sodium selenite.

Elemental selenium nanoparticles are represented in FIG. 3.

It should be noted that in this example the drying alone reduces a proportion of selenite close to that described in the aforementioned patent applications solely on the basis of the reaction in liquid medium. This again underlines the refinement permitted by drying.

Tests at Other Spraying Temperatures

The same study was repeated with a spray drying process using a lower temperature. Several tests were conducted with different drying temperatures: 120° C. or 160-180° C. or 190-200° C.

Again, before spraying the liquid was still transparent white, confirming that glycine reduces practically no sodium selenite due to its lack of reducing capacity.

Table 5 below shows the nano-elemental selenium content (as a percentage of the total selenium) of the liquid samples before spraying, and the intensity of the red color.

TABLE 5

| before spraying | | |
|---|---|---|
| Description of sample | nano-elemental selenium (as percentage of total selenium) | Intensity of red color |
| Before adding of selenite - before adding of acid | 0% | 0 |
| Before adding of selenite - after adding of acid | 0% | 0 |
| After adding of selenite | 5% | 0 |

After spraying, the color of the sample gradually changed from white to red (190-200° C.) by way of pale pink (120° C.), suggesting that the sodium selenite was gradually reduced by the increase in temperature. This was confirmed by the chemical analysis which shows that the proportion of elemental selenium in nanoparticle form increases by 43% at 120° C., 47% at 180° C. and 48% at 200° C.

Table 6 below shows the nano-elemental selenium content (as a percentage of the total selenium) of the powder samples after spraying as a function of the spraying temperature, together with the intensity of the red color.

TABLE 6

| after spraying | | |
|---|---|---|
| Spraying temperature | nano-elemental selenium (as percentage of total selenium) | Intensity of red color |
| 120° C. | 43.5 | 3 |
| 180° C. | 47.2 | 5 |
| 200° C. | 48.0 | 5 |

These tests demonstrate that, surprisingly, spray drying contributes very significantly to the reduction of sodium selenite to elemental selenium and allows the refinement of a product containing elemental selenium nanoparticles.

Test with Glycine and with a Higher Selenium Content

The previous studies were all carried out with a selenium content of 1%. In order to determine whether the total selenium content of the product can influence the behavior of the selenium, in particular, the aim of the present study was to determine whether a selenium content of more than 1% could influence the proportion of selenium reduced in the liquid phase or during drying.

Description of the Process Used

A tank is filled with 924.47 liters of water. The tank heating is switched on. When the temperature reaches 60° C., a mass of 275 kg of glycine is poured into the mixer while stirring. The temperature is raised to 90° C. Stirring is maintained for 3 minutes and then stopped. A mass of 4.57 kg of phosphoric acid is added. The temperature gradually increases to 90° C. When it reaches 90° C., a mass of 20.34 kg of sodium selenite is added. The heating system is switched off. Stirring is maintained for 1 minute and then stopped. The tank is connected to the pump of the spray tower. Spray drying can begin.

The temperature chosen for spray drying the liquid phases obtained as described above was approximately 220° C.

Results

The procedure described above was implemented and liquid samples before spraying and two samples of powder obtained after spray drying were collected. One powder sample was taken at the beginning of the manufacturing and the second at the end of the manufacturing.

As in the previous examples, to quantify the intensity of the red color of the powder, a subjective classification was used in which 0 represents a sample that does not appear red and 10 represents a totally red sample. Intermediate values between 0 and 10 indicate increasing intensity of the red color.

Table 7 below shows the nano-elemental selenium content (as a percentage of the total selenium) of the liquid samples before and after spraying, together with the intensity of the red color.

TABLE 7

| before and after spraying | | |
|---|---|---|
| Description of sample | nano-elemental selenium (as percentage of total selenium) | Intensity of red color |
| Before spraying | 9% | 0 |
| After spraying At start of manufacturing | 71% | 10 |
| After spraying At end of manufacturing | 69% | 10 |

Before spraying, the solution is transparent, which suggests virtually no reduction in the liquid phase, confirming that glycine reduces practically no sodium selenite due to its lack of reducing capacity. This is confirmed by the analyses which find only 9% elemental selenium relative to the total selenium content. This confirms the previous examples but with a considerably higher selenium content which is increased to 3%.

After spraying, the samples are very red powders. There is no visual difference in red color between samples taken at the beginning or at the end of the manufacturing. This was confirmed by the chemical analysis which shows that the proportion of elemental selenium in nanoparticle form is approximately 70% of the total selenium content.

The glycine-based product contains 3.05% total selenium including approximately 2.17% nano-elemental selenium, the great majority of which is obtained during the spraying.

This last example confirms that, surprisingly, spray drying contributes very significantly to the reduction of sodium selenite to elemental selenium and also enables refinement of a product containing elemental selenium nanoparticles. It is complementary to the previous examples since it demonstrates that the level obtained during spraying can be obtained even with a considerably higher selenium content.

The invention claimed is:

1. A process for preparing a powder containing selenium particles from:

at least one amine compound, and at least one source of selenium, wherein said selenium particles are selenium nanoparticles having a particle size greater than 300 nm and of at most 1000 nm and said process comprises a spray drying step at a temperature of at least 100° C.

2. The process of preparation according to claim 1, comprising the following steps:
a) selecting at least one amine compound,
b) producing a solution or suspension of said at least one amine compound,
c) optionally adding, with stirring, at least one pH modifier,
d) adding, with stirring, said at least one source of selenium, and
e) subjecting the resulting mixture to spray drying at a temperature of at least 100° C.

3. The process according to claim 2, wherein step a) comprises the digestion of a macromolecule by an enzyme in order to obtain said at least one amine compound.

4. The process according to claim 2, wherein said at least one pH modifier is added and said pH modifier(s) is/are a base or bases.

5. The process according to claim 4, wherein said pH modifier comprises sodium hydroxide.

6. The process according to claim 2, wherein said at least one pH modifier is added and said pH modifier(s) is/are an acid or acids.

7. The process according to claim 6, wherein said pH modifier comprises phosphoric acid.

8. The process according to claim 1, wherein the source of selenium comprises sodium selenite.

9. The process according to claim 1, wherein the spray drying is performed at a temperature of at least 120° C.

10. The process according to claim 9, wherein the spray drying is performed at a temperature of at least 160° C.

11. A process for increasing the nano-elemental selenium content of a powder containing selenium nanoparticles having a particle size greater than 300 nm and of at most 1000 nm, said powder having been obtained from:
at least one amine compound, and
at least one source of selenium,
wherein said process comprises a spray drying step at a temperature of at least 100° C.

12. The process according to claim 11, wherein the source of selenium comprises sodium selenite.

13. The process according to claim 12, wherein the spray drying is performed at a temperature of at least 120° C.

14. The process according to claim 13, wherein the spray drying is performed at a temperature of at least 160° C.

15. The process according to claim 2, wherein said organic compound is an amine compound.

16. The process according to claim 15, wherein said amine compound comprises at least one amino acid.

17. The process according to claim 16, wherein said amino acid is glycine.

18. The process according to claim 3, wherein said macromolecule is a protein and said enzyme is a protease.

19. The process according to claim 2, wherein said source of selenium is sodium selenite or sodium selenate.

20. The process according to claim 2, wherein said particle size is greater than 300 nm and of at most 600 nm.

21. The process according to claim 2, wherein said amine compound is an amino acid.

22. The process according to claim 1, wherein:
said amine compound is soy protein,
said source of selenium is sodium selenite, and
said spray drying step is carried out at a temperature of at least 120° C.

23. A process for preparing a powder containing selenium particles from:
glycine, and
sodium selenite,
wherein said selenium particles are selenium nanoparticles having a particle size ranging from 1 nm to 1000 nm and said process comprises a spray drying step at a temperature of at least 120° C.

24. The process according to claim 23, wherein the selenium nanoparticles have a particle size greater than 300 nm and of at most 1000 nm and said spray drying step is carried out at a temperature of at least 160° C.

* * * * *